United States Patent [19]

Waite, Jr.

[11] Patent Number: 4,917,197

[45] Date of Patent: Apr. 17, 1990

[54] WEIGHING SYSTEM FOR VEHICLES

[75] Inventor: Robert K. Waite, Jr., Groton, Mass.

[73] Assignee: Blodgett & Blodgett, P.C., Worcester, Mass.

[21] Appl. No.: 309,341

[22] Filed: Feb. 10, 1989

[51] Int. Cl.⁴ .................... G01G 19/08; G01G 3/14
[52] U.S. Cl. .................................. 177/137; 177/210 R
[58] Field of Search ............................. 177/136–140, 177/210 R

[56] References Cited

U.S. PATENT DOCUMENTS

| | | | |
|---|---|---|---|
| 1,407,078 | 2/1922 | Murray | 177/137 |
| 3,306,383 | 2/1967 | Saxton et al. | 177/136 |
| 3,648,790 | 3/1972 | Bishop | 177/137 |
| 4,728,922 | 3/1988 | Christen et al. | 177/136 X |
| 4,789,033 | 12/1988 | Dohrmann | 177/137 |

FOREIGN PATENT DOCUMENTS 2178546  2/1987  United Kingdom ............... 177/136

Primary Examiner—George H. Miller, Jr.
Attorney, Agent, or Firm—Norman S. Blodgett; Gerry A. Blodgett

[57] ABSTRACT

A weighing system for a vehicle having a spring supportive frame which moves relative to the axles of the vehicle in response to changes in load weight on the vehicle. The weighing system includes at least one position indicator for each axle to be monitored which provides electrical signals which vary in accordance with the built position of the frame relative to the axle which is being monitored. The weighing system also includes a programmed central processing unit for receiving the electrical signals from the position indicator and for calculating the load weight on the frame, based on the value of the electrical signals.

7 Claims, 4 Drawing Sheets 4,917,197

WEIGHING SYSTEM FOR VEHICLES

BACKGROUND OF THE INVENTION

The present invention is generally directed to a weighing system for vehicles and is particularly directed to a weighing system which measures weight on one or more of the axles of a commercial load carrying vehicle.

Each type of commercial vehicle has a maximum weight or load limit which must not be exceeded for a variety of reasons. Safety to the driver of the vehicle and to people outside of the vehicle are the prime considerations for maintaining the load weight of the vehicle within prescribed limits. The prevention of damage or excessive wear to the vehicle due to excessive load weight is another important consideration. In addition, most states have laws for regulating vehicle load weight. For safety and legal reasons, the operator of the vehicle should be aware of the weight on each axle of the vehicle and the total axle load of the vehicle. Weight regulation is monitored by weigh stations along roadsides and portable scales which can be carried in a car by state police.

Vehicle mounted scale systems have been used in the past. These systems utilize strain gauges which are applied to stressed members of the truck frame or suspension system. A more recent weighing system includes the use of a load cell which is placed between the frame and the body or trailer attachment point of the truck. The weighing systems in present use have certain drawbacks for practical commercial use. The weighing systems for commercial vehicles which are presently being used require disassembly of the truck/body system for installation which adds considerably to the installation cost of the system. Also, the system requires frequent recalibration These and other difficulties experienced with the prior art devices have been obviated by the present invention.

It is, therefore, a principle object of the invention to provide a weighing system for vehicles which can be applied to the vehicle without removing any of the major components of the vehicle.

Another object of this invention is the provision of a weight measuring system for vehicles which requires calibration only once, upon installation.

A further object of the present invention is the provision of a weight measuring system for vehicles which is not directly subjected to the weight of the frame and load on the frame so that the system is unlikely to be damaged by excessive load conditions.

It is another object of the present invention to provide a weight measuring system for vehicles which includes an electrical transducer and means for protecting the transducer from weather and road elements A still further object of the invention is the provision of a weight measuring system for vehicles which is simple in construction, easy to install and capable of a long life of useful service with a minimum of maintenance.

With these and other objects in view as will be apparent to those skilled in the art, the invention resides in the combination of parts set forth in the specification and covered by the claims appended hereto.

SUMMARY OF THE INVENTION

In general, the invention consists of a weighing system for a vehicle having a position indicator for sensing the vertical movement between the frame of the vehicle and one of the wheel axles and for providing an electrical signal which varies in accordance with the relative vertical position of the frame with respect t the axle and which is indicative of the load weight on the frame of the vehicle. The position indicator is operatively connected to a programmed central processing unit which is for receiving the electrical signals from the position indicator and for calculating the weight on the frame based on the value of the electrical signals. More specifically, the position indicator includes a linear motion position transducer which produces analog signals and an electrical digitizer for converting the analog signals to digital signals.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 5:
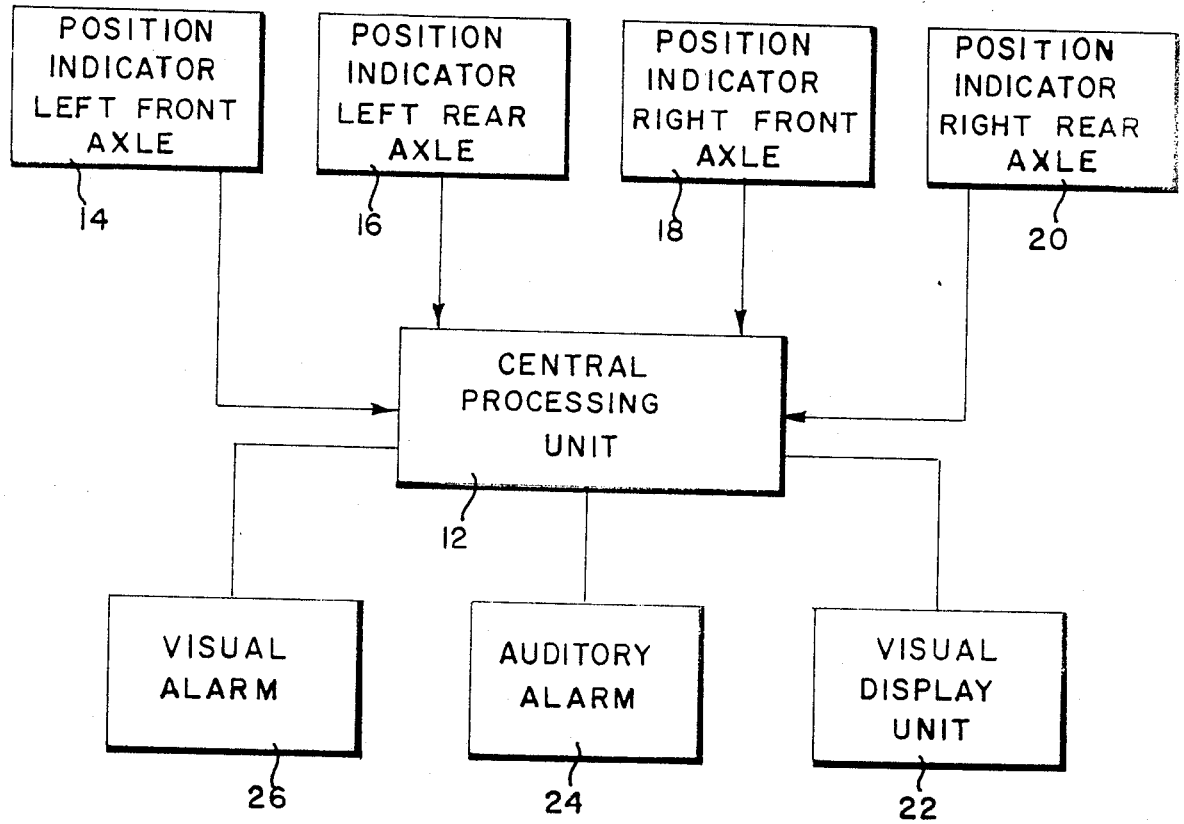
FIG. 5 is a schematic view of the weighing system of the present invention.

Referring first to FIG. 5 the weighing system of the present invention is generally indicated by the reference numeral 10 and is diagramatically illustrated. The weighing system 10 comprises a programmable central processing unit 12, which is operatively connected to one or more position indicators 14, 16, 18 and 20. The central processing unit 12 is also connected to a visual alarm 26, an auditory alarm 24 and a visual display unit 22. The position indicator 14 is located at the left end of the front axle of the vehicle, the position indicator 16 is located at the left end of the rear axle, the position indicator 18 is located at the right end of the front axle and the position indicator 20 is located at the right end of the rear axle. Each position indicator provides electrical signals to the central processing unit 12 in response to changing weight load on the axles of the vehicle in a manner to be described.

Figure 1:
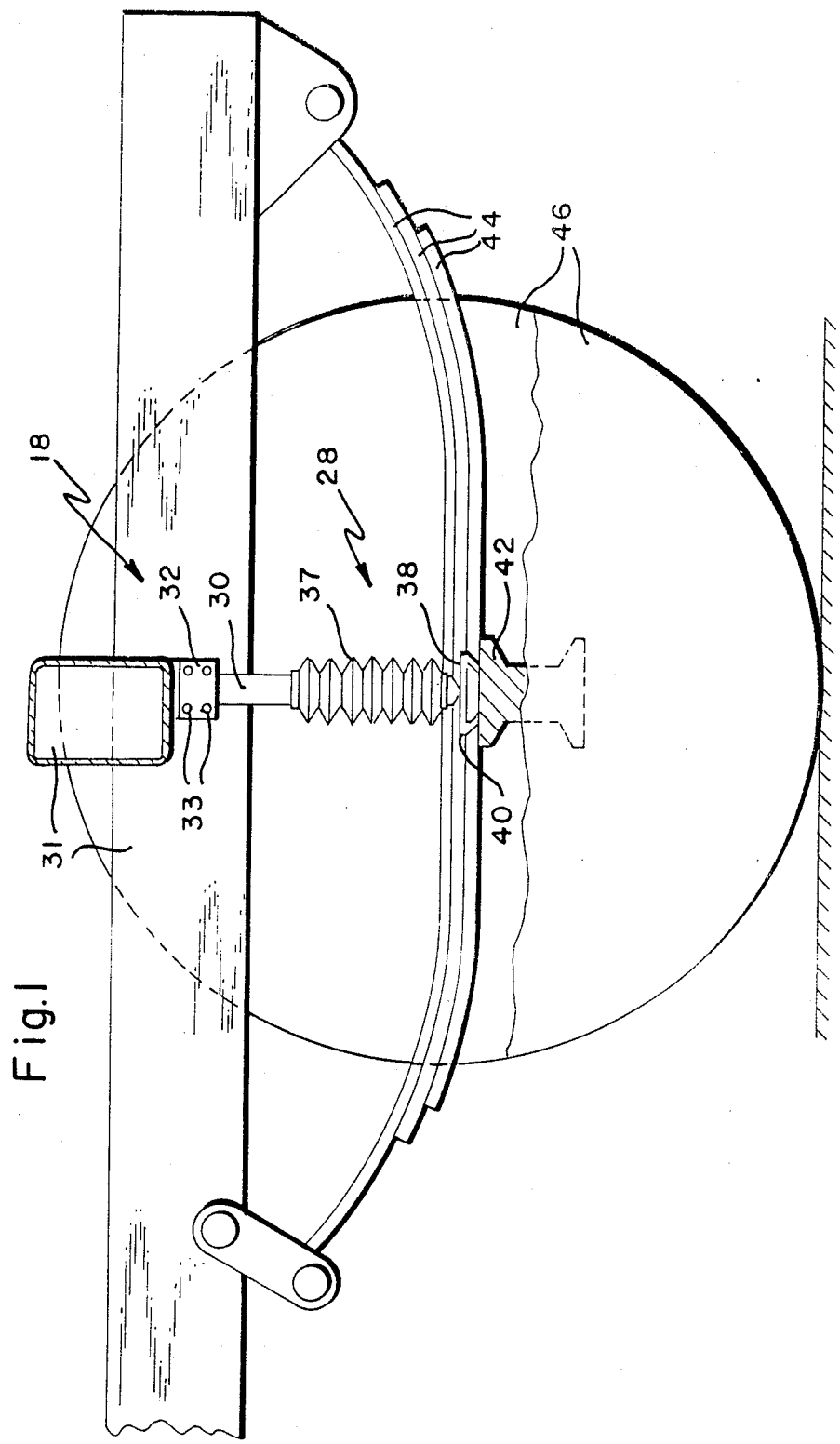
FIG. 1 is a fragmentary side elevational view of a weighing system embodying the principles of the present invention as applied to the front axle of a vehicle.
Figure 3:
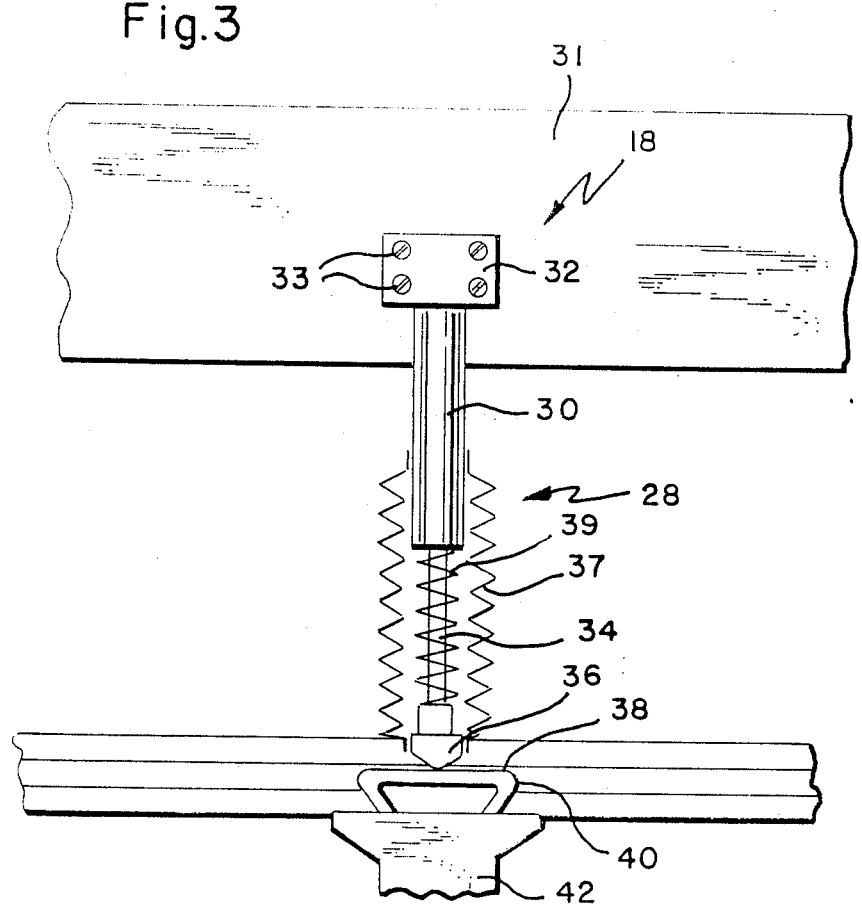
FIG. 3 is an enlarged side elevational view of the weighing system of FIG. 1 on an enlarged scale with portions broken away.

Referring to FIGS. 1 and 3, the position indicator 18 is shown applied to the right end of the front axle, 42, of the vehicle. The position indicator 18 comprises a housing 30 and a rod 34 which is slidably mounted axially within the housing 30. The upper end of the housing 30 is attached to a mounting block 32 by means of fasteners 33. The mounting block 32 is fixed to the frame 31 of the vehicle or truck by welding or fasteners. The rod 34 extends from the lower end of the hosing 30 and has a free end which is fixed to an end cap 36. The end cap 36 is made of a tough machinable polymeric material such as a form of acetyl resin, particularly the form known as DELRIN (a trademark of Dupont). The rod 34 is completely enclosed within a pleated elastomeric sleeve 37.

The upper end of the sleeve 37 fits snugly on the lower portion of the housing 30 and the lower end of the sleeve 37 fits snugly on the end cap 36. The lower end of the sleeve 37 moves with the end cap 36, so that the sleeve 37 folds and unfolds like an accordion in response to the axial movement of the rod 34 within the housing 30. The position transducer 28 is, thereby, protected against weather and road elements such as water, oil, grease, dirt or any other contaminating material which would interfere with the smooth precision operation of the position transducer.

The position transducer of the preferred embodiment consists of a potentiometer the type such as that which is sold by Waters Manufacturing, Inc. of Weyland, Mass. under the trademark SHORT LONGFELLOW Model-SLF (W) 100A5. The electrical signal which is produced by the position transducer is an analog signal in the form of voltage which varies in accordance with the position of the rod 34 relative to the housing 30. The analog signal is converted to a digital signal by a digitizer which is operatively connected to the position transducer and operatively connected to the central processing unit 12 so that the electrical signal which is utilized by the central processing unit is a digital signal.

The linear motion position transducer 28 is installed so that the end cap 36 engages the upper surface 38 of a plate 40 which is fixed to the top of the front axle 42 the rod 34 is biased toward the plate 38 by a compression spring 39. When there is no load on the truck, the rod 34 is slightly extended into the housing 30. The ends of a leaf spring assembly 44, are pivotally connected to the frame 31 and rest on the front axle 42. When weight is added to the truck, the frame 31 is forced downwardly against the bias of the leaf spring assembly 44. This causes the housing 30 to move downwardly axially relative to the rod 34. The electrical signals which are produced by the linear motion position transducer 28 vary in accordance with the position of the housing 30 relative to the rod 34. The electrical signals produced by the transducer 28, therefore, correlate with the load weight on the vehicle or truck The calibration data for the weighing system is stored in the memory portion of the central processing unit 12 at the time of installation of the system. The visual display unit 22 is utilized for calibration of the weighing system and for monitoring this system during normal operation of this system after the initial calibration has been made. The axial motion of the housing 30 with respect to the rod 34 is tied directly to the deflection of the spring assembly 44 in response to load weight on the vehicle. The spring assembly may present a relation of restoring force versus deflection which is linear, parabolic, eliptic, or a combination of one or more of these. During calibration, a set of weight and deflection data is taken and stored in the central processing unit 12. The deflections are created by loading the vehicle with known units of weight and correlating the weight readings with the electrical signals from the linear motion position transducer 28. The plurality of data points are stored and used by the central processing unit 12 for interpolation to produce a continuous curve for measurements If the truck is utilized for carrying a uniform type of load such as sand a single position indicator, such as indicator 18, is used. However, if the truck is being used for carrying non-uniform loads such as furniture or machinery, a second position indicator is used. The second indicator, such as indicator 20 which is identical to indicator 18, is installed on the other end of the axle 42.

Figure 2:
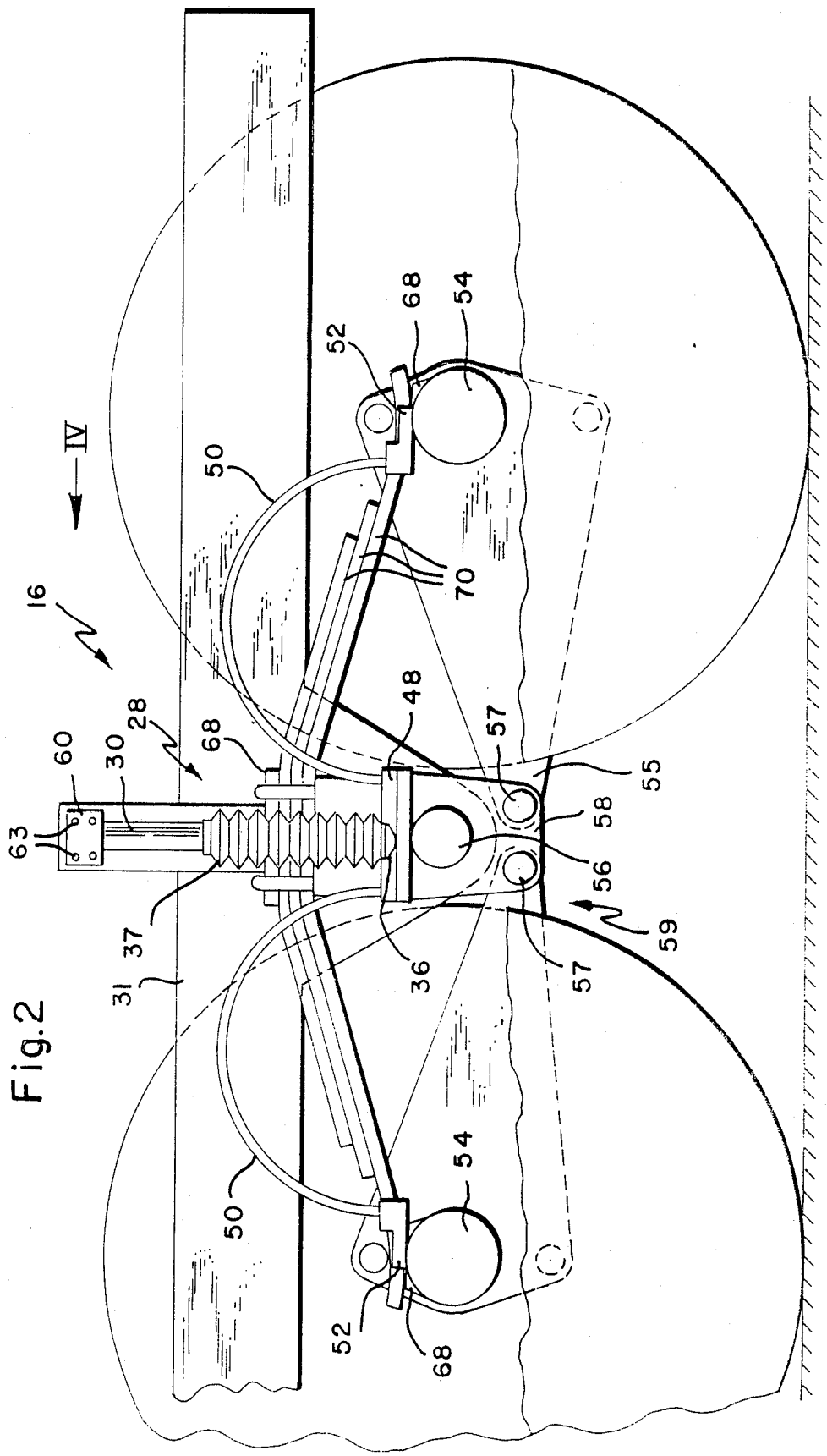
FIG. 2 is a fragmentary side elevational view of a weighing system embodying the principles of the present invention as applied to a double rear axle configuration of a vehicle, such as a truck.
Figure 4:
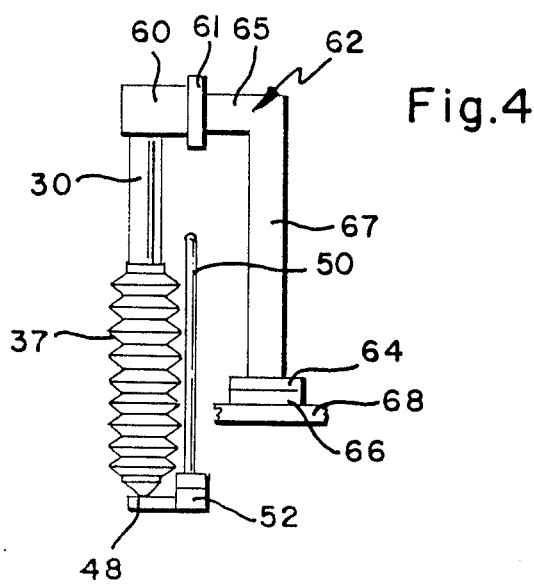
FIG. 4 is a rear elevational view of the weighing system which is shown in FIG. 2.

Referring to FIGS. 2 and 4 the position indicator 16 is shown applied to the left side of an articulated rear axle system of the truck. The rear axle system of the truck is generally indicated by the reference numeral 59 and comprises a pair of axles 54. Each axle 54 is mounted in a plate 55 which is pivotally mounted on a shaft 57 which is journaled in a block 58. The block 58 is located between the axles 54 and is pivotally mounted on a horizontal shaft 56 which is part of the frame 31 of the vehicle. A leaf spring assembly 70 rests on the block 58. The ends of the spring assembly 70 engage spring plates 68 which are fixed to the axles 54. The position indicator 16 is shown in FIG. 2 applied to the left end of the rear axle system 59. The position indicator 16 includes the same linear motion position transducer 28 which is utilized for the position indicator 18. The upper end of the housing 30 is fixed to a lock 60 which is fastened to a mounting plate 61 by fastening means 63. The plate 61 is fixed to the horizontal leg 65 of an "L" shaped bracket, generally indicated by the reference numeral 62. The vertical leg of the bracket 62, indicated by the reference numeral 67, extends downwardly and is fixed to a mounting plate 64, which is fastened to a mounting plate 66. The mounting plate 66 is fastened to the spring plate 68. The housing 30 moves vertically with the spring plate 68 and the frame of the vehicle relative to the axles 54. The end cap 36 of the transducer 28 engages an "L" shaped block 48 which is suspended between the axles 54 by a pair of spring rods 50. The inner end of each rod 50 is fixed to the block 48. The outer end of each rod 50 is fixed to a shoe 52 which is fixed to one of the spring plates 68. Each rod 50 curves upwardly from its respective shoe 52 and block 48 as shown in FIG. 2.

The articulated rear axle system 59 enables the axles 54 to move relative to each other, due to uneven terrain. This means that the position of each shoe 52, relative to the frame 31, varies in accordance with variations in terrain without any change in loading on the truck. However, the position of the block 48 represents an average of the relative positions of the axles 54. Therefore, the position of the block 48 relative to the frame remains substantially constant for a given load on the vehicle. As the load on the vehicle is increased, frame 31 of the vehicle moves downwardly toward the axles 54 against the bias of the spring assembly 70. This causes the housing 30 to move toward the end cap 36 so that the rod 34 moves axially within the housing 30 in the same manner as that which is described for the position indicator 18. The central processing unit 12 is calibrated for the electrical signals which are received from the position indicator 16 in the same manner as the calibration for the position indicator 14. As in the case of the front axle, the single position indicator for the rear axle system 59 is sufficient for certain load conditions in which the load is substantially evenly distributed. However, for uneven loads, the position indicator 20, which is identical to the indicator 16, is utilized on the opposite side of the truck. The two position indicators 16 and 20 are utilized for the rear axle. The central processing unit is programmed to average the signals from the units 16 and 20 so that the weight which is shown on the display unit 22 represents the total load weight on the rear axle of the vehicle. The central processing unit 12 is also programmed to actuate the visual display unit 22 for displaying a total load weight on the vehicle, based on signals which are received from front and rear axle position indicators.

Clearly, minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A weighing system for a vehicle having a frame, a plurality of axles, a plurality of wheels rotatably mounted on the axles and a plurality of springs operatively connecting the axles and the frame for yieldingly supporting the frame above the axles so that the frame moves vertically toward and away from said axles in response to weight which is added to and subtracted from the frame, said weighing system comprising:
   (a) a position indicator for sensing the relative vertical movement between the frame of the vehicle and one of said axles and for providing electrical signals which vary in accordance with the relative vertical position of said frame with respect to said one axle and which are indicative of the load weight on said frame, said position indicator comprising a linear motion position transducer which produces analog electrical signals, and an electrical digitizer for converting said analog signals to digital signals, said linear motion transducer comprising a housing which is fixed against vertical motion relative to said frame, a rod which is slidably mounted within said housing, said rod having a free end which extends from said housing and which operatively engages said one axle, and means for biasing said rod toward said axle and away from said housing so that said rod moves vertically with said one axle and relative to said housing, and
   (b) a programmed central processing unit which is operatively connected to said position indicator for receiving said electrical signals and for calculating the weight on said frame based on the value of said electrical signal.

2. A weighing system for a vehicle as recited in claim 1, wherein said linear motion transducer further comprises a compressible resilient sleeve; one end of said sleeve being attached to the free end of said rod and the opposite end of said sleeve being attached to said housing so that said sleeve encloses said rod.

3. A weighing system for a vehicle as recited in claim 2, wherein said sleeve is pleated and is made of an elastomeric material.

4. A weighing system for a vehicle as recited in claim 1, further comprising a cap which is fixed to the free end of said rod, said end cap being made of a tough polymer which has high impact strength.

5. A weighing system for a vehicle as recited in claim 4, wherein said polymer is acetyl.

6. A weighing system for a vehicle having a frame, a plurality of axles, a plurality of wheels rotatably mounted on the axles and a plurality of springs operatively connecting the axles and the frame for yieldingly supporting the frame above the axles so that the frame moves vertically toward and away from said axles in response to weight is added to and subtracted from the frame, said vehicle having at least one front axle and at least two rear axles, said weighing system comprising:
   (a) a position indicator on each side of the vehicle for the two rear axles for sensing the relative vertical movement between the frame of the vehicle and said axles and for providing electrical signals which vary in accordance with the relative vertical position of said frame with respect to said axles and which are indicative of the load weight on said frame, each of said position indicators comprising:
      (1) a block which is located between the two rear axles,
      (2) a linear motion position transducer which is operatively connected at one end of the frame of the vehicle and at its opposite end of said block,
      (3) a first connector which comprises a resilient flexible bar which is fixed at one end to said block and which is operatively connected at its opposite end to one of said rear axles, and
      (4) a second connector which comprises a resilient flexible bar which is fixed at one end to said block and which is operatively connected at its opposite end to the other of said rear axles so that the vertical position of said block is an average of the vertical positions of said rear axles relative to said frame, and
   (b) a programmed central processing unit which is operatively connected to said position indicator for receiving said electrical signals and for calculating the weight on said frame based on the value of said electrical signal.

7. A weighing system as recited in claim 6, wherein said bar curves upwardly from said block and the corresponding one of said rear axles.

* * * * *